US005576092A

United States Patent [19]

Jongewaard et al.

[11] Patent Number: 5,576,092

[45] Date of Patent: Nov. 19, 1996

[54] DONOR SHEET FOR THERMAL PRINTING

[75] Inventors: Susan K. Jongewaard, North St. Paul; Alan G. Miller, Stillwater, both of Minn.

[73] Assignee: Minnesota Mining and Manufacturing Company, St. Paul, Minn.

[21] Appl. No.: 719,144

[22] Filed: Jun. 21, 1991

Related U.S. Application Data

[62] Division of Ser. No. 326,300, Mar. 21, 1989, Pat. No. 5,034,438.

[51] Int. Cl.$^6$ .................... B32B 27/14

[52] U.S. Cl. .................... 428/195; 428/211; 428/481; 428/484; 428/485.1; 428/488.4; 428/523

[58] Field of Search .................... 428/195, 211, 428/488.1, 488.4, 481, 484, 523

[56] References Cited

U.S. PATENT DOCUMENTS

| | | | |
|---|---|---|---|
| 3,635,746 | 1/1972 | Karlan | 428/48 |
| 4,686,549 | 8/1987 | Williams et al. | 503/227 |
| 4,707,404 | 11/1987 | Morishita et al. | 428/195 |
| 4,778,729 | 10/1988 | Mizobuchi | 428/488.4 |
| 4,822,653 | 4/1989 | Kauffman et al. | 428/34.2 |
| 5,001,012 | 3/1991 | Sarkar et al. | 503/227 |

FOREIGN PATENT DOCUMENTS

| | | |
|---|---|---|
| 0138483 | 4/1985 | European Pat. Off. . |
| 54-035095 | 3/1979 | Japan . |
| 56-109726 | 8/1981 | Japan . |
| 56-155794 | 12/1981 | Japan . |
| 58-171992 | 10/1983 | Japan . |
| 60-210494 | 10/1985 | Japan . |
| 60-204387 | 10/1985 | Japan . |
| 60-219080 | 11/1985 | Japan . |
| 61-246093 | 11/1986 | Japan . |
| 62-297183 | 12/1987 | Japan . |

*Primary Examiner*—Mark D. Sweet
*Attorney, Agent, or Firm*—Gary L. Griswold; Walter N. Kirn; H. Sanders Gwin, Jr.

[57] ABSTRACT

A layer for preventing sticking of thermal image-forming materials to thermal printheads during thermal printing. The layer comprises polymeric material having a non-cyclic, substantially completely saturated hydrocarbon backbone, said backbone having substantially only hydrogen atoms and methyl groups attached to randomly positioned carbon atoms thereon, with no more than one methyl group attached to any one backbone carbon atom. Application of the anti-stick layer to the substrate is facilitated by the solubility of the polymeric material in commonly used organic solvents, thereby allowing very thin layers of the coating to be applied in the form of dilute solutions.

7 Claims, 1 Drawing Sheet

DONOR SHEET FOR THERMAL PRINTING

This is a division of application no. 07/326,300 filed Mar. 21,1989 now U.S. Pat. No. 5,034,438.

BACKGROUND OF THE INVENTION

1. Field of the Invention

This invention relates to thermal printing, and, in particular, to a coating for preventing sticking of thermal printing materials to a thermal printhead of a thermal printer.

2. Discussion of the Prior Art

In thermal printing, images are formed by heating heat-activatable materials in an imagewise manner. Such heating is commonly conducted by means of a thermal printhead, which consists of an array of small, electrically heatable elements, each of which is preferably activated by a computer in a time sequence designed to produce imagewise heating. The most common forms of thermal printing are direct thermal printing and thermal transfer printing. Materials suitable for use in either of these forms of thermal printing will hereinafter be called thermal printing materials.

In one form of direct thermal printing, colorless forms of heat-activatable dyes are incorporated into a polymeric binder borne on a suitable carrier such as a sheet of paper or film. Upon application of heat, the colorless forms of the dyes are converted to their colored forms, so that when heating occurs in an imagewise manner, an image is formed in the dye-containing material. The carrier sheet thereby bears the formed image directly, without transfer of imaging material to other surfaces. In this form of printing, it is preferred that the polymeric binder be in direct contact with the thermal printhead during the printing process. Because commonly used polymeric binders are thermoplastic, there is a tendency for them to soften in the heated areas and stick to the thermal printhead, thereby causing malfunctioning of the printing apparatus and reduction in image quality.

Thermal transfer printing differs from direct thermal printing in that the printing process occurs by heat-activated transfer of image-forming material from a donor to a receptor such that the receptor bears the formed image. Imagewise heating of the material to be transferred from the donor to the receptor is accomplished by a thermal printhead, operated in the manner described previously.

The construction of the donor requires that the image-forming material be carried upon a thin, flexible backing, typically paper or film. The image-forming material may take several forms, such as a meltable colored wax, a diffusing dye, or heat activatable reactants which, when combined with other reactants incorporated into the receptor, form a colored compound. Many of the most suitable backing materials, such as polyethylene terephthalate (PET) film, are thermoplastic, and therefore have a tendency to soften and stick to the printhead during the thermal imaging process, thereby causing poor print quality and malfunctioning of the printing machine. It is, therefore, a fundamental problem in the design of such donor materials to provide a means for preventing such sticking.

Prevention of sticking by selecting materials for backings having softening temperatures higher than those encountered by the donor in the printing process is disclosed in unexamined Japanese Patent Application No. J6 248-093-A, wherein copolymers containing acrylonitrile are proposed. Alternatively, materials that remain non-adhesive even though they may be softened by the heat of the printer are disclosed as anti-stick layers in unexamined Japanese Patent Application No. J8 0210-494-A, wherein polyethylene is proposed as a backing material. Both of these materials suffer from high cost and limited availability. The high softening and melting temperatures of polymers containing acrylonitrile give them great heat resistance, but this heat resistance hinders attempts to form them into film in an economically feasible manner. Polyethylene is more easily processed, due to its relatively low melting point of 137° C., but it requires special treatment to give it the mechanical properties necessary for use as a backing for a donor.

Insertion of an anti-stick layer between the thermal printhead and the surface of the thermal printing material which contacts the thermal printhead can be used to minimize sticking. Materials that exhibit non-adhesive properties are well-known. For example, low surface energy materials, such as fluoropolymers and silicones, may be effective. Alternatively, nonpolymeric materials, such as waxes, fatty acids, and metal stearates, have been found to exhibit anti-stick properties. All of these materials, however, exhibit certain physical and economic disadvantages which make alternative means for preventing sticking of donor backing materials to thermal printheads desirable.

Another major consideration in applying anti-stick layers to donor backings is the method by which such layers are to be applied. Since it is desired that anti-stick materials be applied in very thin layers, the most suitable method of application is to dissolve a small amount of the anti-stick material in a relatively large amount of solvent, and coat the resulting solution onto the surface of the printing material which is nearest to the thermal printhead, after which the solvent is evaporated by conventional drying means, leaving a thin polymeric layer. Use of this method of application requires that the anti-stick polymeric material be soluble in at least one suitable solvent. Many anti-stick materials are not readily soluble in commonly used organic solvents.

Although polymeric silicone materials may be soluble in organic solvents and at the same time may exhibit anti-stick behavior, they are very migratory, i.e., they spontaneously spread along surfaces for long distances, thereby contaminating large areas of the coating facilities, as well as the image-forming material. Further, when the donor is stored in roll form, presently known silicones may migrate from the side of the donor material to which they have been applied to the opposite side of the donor, where they may interfere with the thermal transfer imaging process. Crosslinking or high degrees of polymerization of silicone polymers may be helpful in reducing migration, but because even small amounts of uncrosslinked silicones can have a significant negative effect upon imaging, it is difficult to achieve sufficient crosslinking to completely eliminate the migration problem.

Attempts have been made to utilize polymeric materials that are soluble in commonly used organic solvents as anti-stick layers. In particular, in unexamined Japanese Patent Application No. J6-0204-387-A, the use of styrene-butadiene rubber (SBR) as an anti-stick layer is disclosed. While SBR is known to exhibit anti-stick properties in thermal printing, it is also known to exhibit strong adhesion to itself. This self-adhesion poses severe handling problems, since in production and in use, great care would have to be exerted to prevent any part of the SBR-coated side of the donor from touching any other SBR-coated portion of the material. As is further well-known, other unvulcanized rubber materials also exhibit adhesion to themselves or to other materials. The adhesion properties exhibited by SBR and other elastomeric materials would, therefore, tend to indicate that elastomers are unlikely to be useful in the formulation of anti-stick layers.

SUMMARY OF THE INVENTION

This invention provides thermal printing materials, e.g., a donor, having an anti-stick layer. The anti-stick layer is formed by applying a layer of polymeric material to the surface of the thermal printing material that comes in contact with a thermal printhead, e.g., the backing of a donor. Preferably, this layer is applied as a solution of the polymeric material in an organic solvent. Removal of the solvent leaves a thin layer of the anti-stick material on the thermal printing material.

Polymers that are suitable for preparing the anti-stick layer of this invention include those having non-cyclic, substantially completely saturated hydrocarbon backbones having substantially only hydrogen atoms and methyl groups, alternatively referred to as methyl side groups, attached thereto, with no more than one methyl group attached to any one backbone carbon atom. Additionally, small amounts of diene units can be present in the polymer backbone, allowing some unsaturation and small amounts of substituents other than hydrogen and methyl group can be attached to the hydrocarbon backbone. As used herein, the phrase "substantially completely saturated" means at least about 95 mole percent of the backbone is saturated; the phrase "substantially only" means less than about 5 mole percent of the substituents attached to the hydrocarbon backbone can be groups other than hydrogen and methyl. It is preferred that the substituent methyl side groups attached to the hydrocarbon backbone be arranged randomly or irregularly so as to inhibit crystallization, thereby enhancing solubility of the polymer in organic solvents at room temperature. Representative examples of polymeric materials suitable for this invention include ethylene-propylene copolymers, ethylene-propylene-diene copolymers, and block copolymers comprised of ethylene-propylene copolymeric blocks attached to polymeric blocks sufficiently incompatible with the ethylene-propylene blocks to enable such blocks to form separate domains from the ethylene-propylene blocks. Polystyrene blocks are particularly suitable for this purpose.

The materials for the anti-stick coatings useful in this invention are soluble in organic solvents. The materials disclosed herein are effective even when applied in very thin layers. They have a lesser tendency to contaminate, erode, or otherwise damage commercially available thermal printheads, and they are inert to the chemical reactions involved in direct thermal printing. Finally, the materials of the anti-stick layer of the present invention are commercially available at a relatively low cost.

BRIEF DESCRIPTION OF THE DRAWINGS

The invention is described in detail hereinafter with reference to the accompanying drawings wherein like reference characters refer to the same parts throughout the views and in which.

DESCRIPTION OF THE INVENTION

Figure 1:
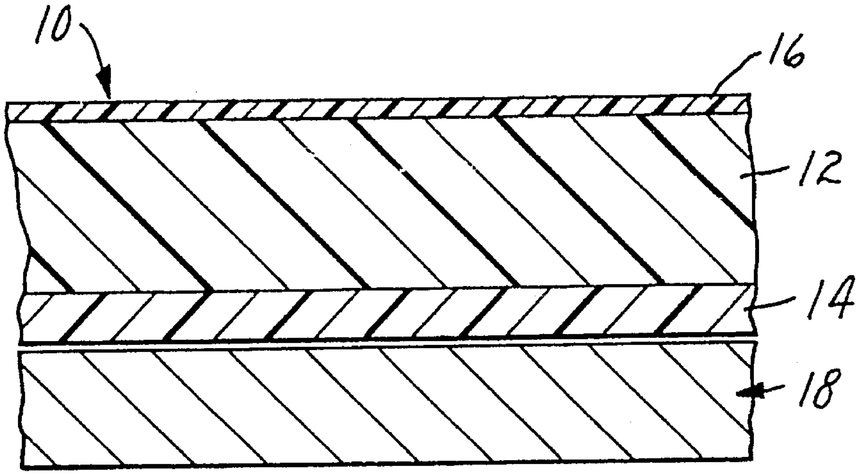
FIG. 1 is a cross-sectional view of a donor sheet of the present invention.

FIG. 1 shows a donor 10 suitable for use in a thermal transfer printing process. Donor 10 comprises a backing 12, formed of a polymeric or fibrous material, preferably having a caliper less than about 20 micrometers. Materials suitable for backing 12 include polymers such as polyethylene terephthalate (PET), polyethylene naphthalate, polyethylene, and polymer-impregnated paper or fibrous materials, commonly referred to as "capacitor paper". The preferred material for backing 12 is PET film, because of its relatively low cost, superior mechanical properties, and ready availability in the desired caliper range. The major surface of backing 12 to which a layer 14 of image-forming material is applied will hereinafter be called the front side of donor 10. The opposite major surface of backing 12, to which an anti-stick layer 16 is applied, will hereinafter be called the back side of donor 10.

Layer 14 of donor 10 typically comprises a meltable wax or meltable polymeric material, to which has been added colorants and other additives to improve transferability. Colorants and additives are well known to one of ordinary skill in the art. Alternatively, layer 14 of donor 10 can comprise a sublimable dye or other colorant which is transferable upon application of heat. Alternatively, layer 14 of image-forming material can comprise at least one chemical substance which, upon application of heat, is transferred to a receptor 18 and reacts with other materials contained on receptor 18 to form a colored compound, which colored compound is then retained on receptor 18. The receptor then contains the formed image. Examples of this mode of image formation include systems wherein the leuco form of a dye is incorporated into the receptor, and a phenolic compound is incorporated into layer 14 of image-forming material, which phenolic compound, upon heating, diffuses into the receptor, thereby converting the leuco form of the dye to its colored form to form an image. Alternatively, the leuco form of the dye can be contained in layer 14 of image-forming material, from which it then diffuses, upon heating, into the receptor, to react with an activating agent contained therein.

Adhesion of layer 14 of image-forming material to backing 12 can be improved by surface treatment of backing 12 or by interposing a priming layer (not shown) between layer 14 of image-forming material and backing 12.

Layer 14 of image-forming material can comprise two or more distinct layers, such as, for example, the layer nearest backing 12 being a heat-activated release layer, the next layer providing the colorant, and the outermost layer being formulated to improve adhesion of the colorant to the receptor.

Anti-stick layer 16 comprises a polymeric hydrocarbon having a non-cyclic, substantially completely saturated hydrocarbon backbone, substituted with substantially only hydrogen atoms and methyl side groups. The methyl side groups should be present in sufficiently small numbers to permit substitution at random positions along the backbone, rather than being constrained to a regular pattern, as occurs, for example, in polypropylene. No more than one methyl side group should be attached to any one backbone carbon atom. Such random or irregular substitution inhibits crystallization, thereby promoting solubility of the polymer in organic solvents at temperatures below the melting point of the polymer. A random arrangement of methyl side groups can be achieved by randomly copolymerizing ethylene and propylene in proportions ranging from about 30 mole percent ethylene to about 70 mole percent ethylene. It is known that ethylene-propylene copolymers having an ethylene content in this range are elastomeric.

The ethylene-propylene copolymer can be represented as a copolymerization of a mixture of ethylene and propylene, as follows:

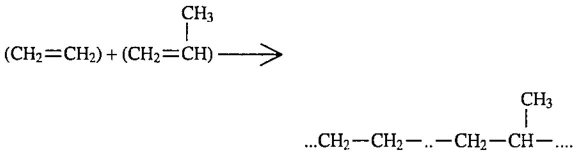

Because the ethylene and propylene molecules are well mixed, and therefore react in random order in the reaction vessel, the placement of the ethylene and propylene, and hence the —$CH_3$ side groups, is in a random sequence along the polymer chain. Such copolymers are therefore called "random copolymers".

Side groups other than methyl side groups are permitted in the ethylene-propylene copolymer, but only in small amounts. For example, diene monomers may be included in the synthesis of the ethylene-propylene copolymer in amounts less than about 5 mole percent. Such monomers are frequently incorporated into commercially available ethylene-propylene copolymers in order to provide double bonds to serve as crosslinking sites for vulcanization; however, the anti-stick layers of the present invention do not require vulcanization or other forms of chemical crosslinking. Other side groups which may be present in small amounts include alkyl groups having more carbon atoms than methyl, and phenyl groups, provided that the overall polymeric material contains substantially only methyl side group substituents and hydrogen atoms.

The relative amounts of ethylene and propylene must be chosen such that the copolymers made therefrom are soluble in at least one commonly used organic solvent, at temperatures near room temperature (e.g., 20° C.). Ethylene-propylene copolymers containing from about 30 mole percent ethylene to about 70 mole percent ethylene are soluble in such solvents as tetrahydrofuran and toluene, and in solvent blends of hexane and methyl-ethyl ketone.

The methyl-substituted noncyclic hydrocarbon chains previously described can comprise one block of a block copolymer, hereinafter called block A, wherein the other block, hereinafter called block B, can comprise a hydrocarbon polymeric chain sufficiently incompatible with block A so as to be able to form separate domains in the copolymer. A preferred composition for block B is polystyrene.

In the case of the styrene block copolymer, each chain of the random ethylene-propylene copolymer shown above is attached to a chain of polystyrene, to yield the block copolymer:

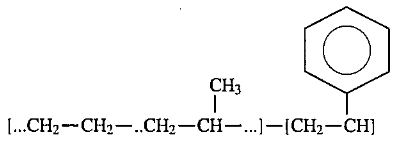

A B

In this structure, the ethylene-propylene portion of the copolymer is a distinct unit, or block, shown as block A in the above structure, which is attached to the styrene portion of the copolymer, shown as block B in the above structure. Copolymers having this structure are called A-B diblock copolymers, because each chain is made up of two blocks, A and B.

Block A is called a "random block" because it is itself a random copolymeric structure of ethylene and propylene formed by the random polymerization of ethylene and propylene.

The advantage of using an anti-stick material comprising an A-B diblock copolymer, wherein the A block is an ethylene-propylene copolymer and the B block is styrene, is that this material is harder and less likely to cling to itself than a material made up of only the ethylene-propylene copolymer (A blocks). This improves handling of donor materials during manufacture and during loading of the donor material into the thermal printing machine. A-B diblock copolymers are therefore preferred over ethylene-propylene random copolymers.

In cases where the A-B diblock copolymer is used as an anti-stick layer, the preferred composition of block A is a random copolymer of ethylene and propylene, wherein ethylene comprises 30 to 70 mole percent, and propylene comprises 70 to 30 mole percent of the copolymeric structure.

It has further been found that additional improvement in performance can be obtained by blending an ethylene-propylene copolymer with an A-B diblock copolymer such as that described above.

When block copolymers comprising ethylene-propylene random blocks attached to polystyrene blocks are used as the anti-stick material, the polystyrene blocks can comprise up to about 40% by weight of the block copolymer. A solvent blend that is particularly useful in preparing solutions of polymeric compositions involving block copolymers of styrene and ethylene-propylene is comprised of 60% by weight hexane and 40% by weight methyl-ethyl ketone.

Anti-stick layer 16 can additionally contain filler materials and other additives, provided such materials do not inhibit the anti-stick features of anti-stick layer 16, and further provided that such materials do not scratch, erode, contaminate, or otherwise damage printheads, or harm image quality. It is preferred that the concentration of such fillers and other additives be kept below about 5% by weight, though the maximum permissible concentration depends upon the particular filler used. Fillers suitable for anti-stick layer 16 of this invention include crystalline polymeric particulate material, crosslinked polymeric particulate material, non-migratory polymeric particulate material having low surface energy, and non-abrasive inorganic materials. Fillers that are particularly suitable in this regard include amorphous fumed silica (e.g., "Syloid", available from W. R. Grace & Co.) and urea-formaldehyde particles of submicrometer size agglomerated into particles of about 5–6 micrometer diameter (e.g., "PergoPak M2", available from Ciba-Geigy), and submicrometer-sized aluminum oxide particles. Addition of such particulate materials has the desirable effect of reducing the coefficient of friction of anti-stick layer 16, as measured at room temperature in contact with glass according to ASTM D1894 -78.

Non-particulate additives suitable for the anti-stick layer of this invention include surfactants, anti-static agents, lubricants, plasticizers, and other modifiers, provided that such additives do not contaminate or damage the printhead, and do not have a deleterious effect upon the imaging capabilities of imaging layer 14 of donor material 10.

Additives that increase the glass transition temperature of the anti-stick layers of the present invention are useful in improving the handling of the image-forming material during manufacture, storage, and use in the imaging machine. Polymeric additives having glass transition temperatures above about 110° C., and preferably above about 130° C., have been found to be useful for this purpose. Examples of such additives include rosins, cellulose esters such as cellulose acetate, cellulose acetate butyrate, cellulose acetate propionate, and soluble chlorofluorelastomers. Of particular usefulness are polymerized rosins having softening temperatures above about 10° C., and even more useful are those rosins having softening temperatures above about 130° C..

Figure 2:
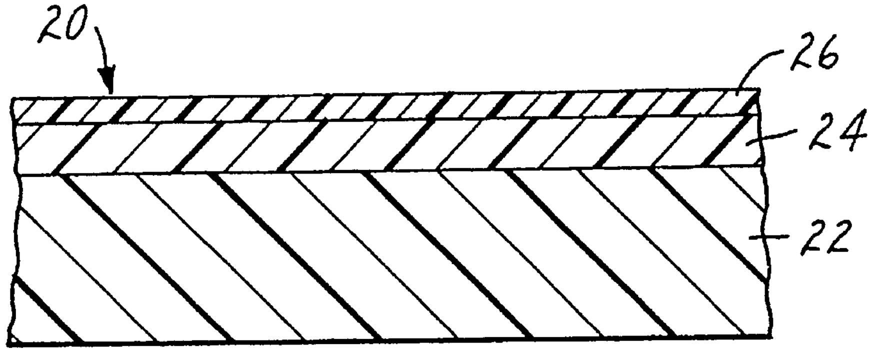
FIG. 2 is a cross-sectional view of a direct thermal printing sheet of the present invention.

.FIG. 2 shows a direct thermal image-forming material 20 comprising a backing 22 bearing an image-forming layer 24 on one major surface thereof. Overlying image-forming layer 24 is an anti-stick layer 26. Backing 22 can be made of paper, polymeric film, or any other substrate suitable for use as a backing material for thermally imageable materials. Image-forming layer 24 can be made of any suitable thermally sensitive image-forming material. A particularly suitable composition for this purpose is a polymeric binder containing a leuco dye and a heat activatable color developing agent, such as, for example, an acid-sensitive leuco dye and a thermally releasable acid.

Application of anti-stick layer 16 or 26 over backing 12 or image-forming layer 24, respectively, can be by means known to one of ordinary skill in the art. A particularly useful method of applying anti-stick layer 16 or 26 involves the steps of dissolving the polymeric material of anti-stick layer 16 or 26 in a suitable organic solvent, and applying the resulting solution to image-forming layer 14 or backing 22, respectively, by means of a conventional coating apparatus, such as a wirewound rod (Mayer rod), knife coater, extrusion bar coater, rotogravure coater, or other conventional coater, followed by drying the applied coating with heated air. The thickness of the resulting coating can be controlled by selection of the concentration of the polymeric material in the solution, and by selecting the amount of coating solution to be applied per unit area, as would be readily determinable by one of ordinary skill in the art. The preferred thickness of anti-stick layer 16 or 26 of the present invention ranges from about 0.07 micrometer to about 0.21 micrometer. Solvents suitable for the coating step include, but are not limited to, toluene, tetrahydrofuran, methyl-ethyl ketone, hexane, land combinations thereof.

The effectiveness of anti-stick layers 16 or 26 of the present invention can be evaluated by means of an apparatus which approximates the conditions encountered in commercially available thermal transfer printing machines. One such apparatus, shown in FIG. 3, operating in the transfer mode, consists of the following components:

1. Thermal printhead 30, having heated printing elements 32, of a type used in commercially available thermal printing machines.
2. Electronic circuitry 34, capable of driving thermal printhead 30 in the manner prescribed by the printhead manufacturer, with the additional capability of varying the voltage driving printing elements 32 of thermal printhead 30, wherein the range of voltage adjustability includes the nominal voltage prescribed by the printhead manufacturer for commercial applications of printhead 30. The circuitry also includes means provided for measuring the voltage provided to printhead 30.
3. Mechanical fixture 36 and heat sink 38 for holding thermal printhead 30 in such a position that printing elements 32 remain in contact with donor 40 and receptor 42 during the printing process.
4. Drive roll 44 for advancing the image-forming materials past the printhead as printing takes place.

Figure 3:
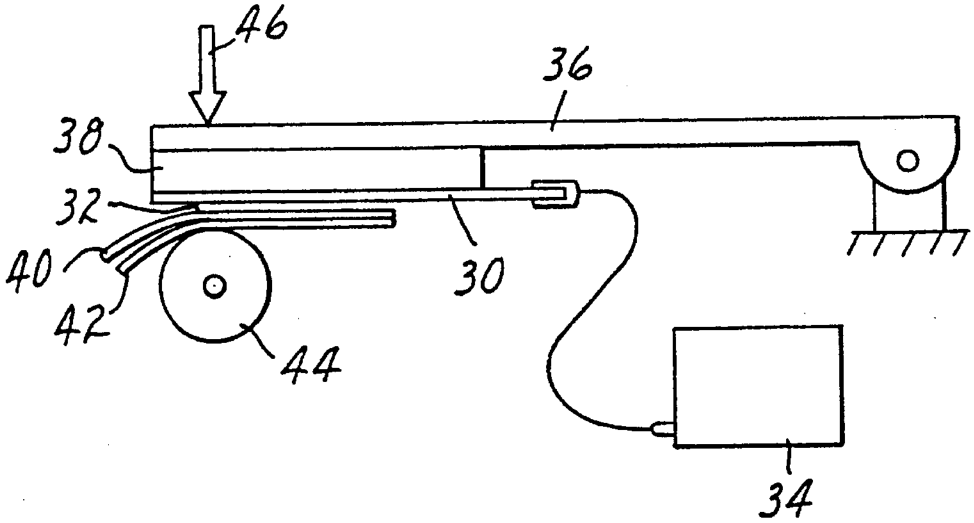
FIG. 3 shows one method by which the receptor sheet can be imaged and by which the materials of the present invention can be tested.

The anti-stick layers of the examples of the present invention were tested using the Kyocera Model KMT-128-8MPD4-CP thermal printhead, which is designed for use in dye transfer thermal printing, and the Hewlett-Packard Part No. 07310-80050, normally used with mass transfer printing materials. While both of these printheads provide essentially equivalent performance when used with image-forming materials for which they are intended, they differ in specific electrical, thermal, and mechanical details. Generally, dye transfer requires a higher imaging temperature, but lower imaging pressure, than does mass transfer. For the test apparatus using the Kyocera Model KMT-128-8MPD4-CP printhead (hereinafter the Kyocera apparatus), the printhead was held against rubber drive roll 44 having a Shore hardness of 40–50, as shown in FIG. 3. Imaging pressure was determined by the force applied in holding printhead 30 against rubber drive roll 44, represented by weight 46 which was about 2.0 kilograms, distributed over the printhead width of 128.0 millimeters. Donor 40 and receptor 42 were sandwiched together and driven past printhead 30 by rotation of drive roll 44.

Electronic circuitry 34 supplying the imaging signal to the Kyocera KMT-128-8MPD4-CP thermal printhead provided a square wave pulse signal wherein the imaging pulses were of about 70 microseconds duration, and the interval between imaging pulses was of 40 microseconds duration. The timing pattern of the imaging signal, in this case 70 microseconds on and 40 microseconds off, will hereinafter be called the burn profile of the imaging signal. The height of the square wave pulses, hereinafter called the pulse voltage, was adjustable to values both above and below a nominal value of 16 volts.

In the case of the test apparatus using the Hewlett Packard printhead (hereinafter Hewlett-Packard apparatus), printhead 30 was pressed against donor 40 with a weight 46 of 593 grams, and donor 40 —receptor 42 combination was driven past printhead 30 at a speed of 1.9 centimeters per second by means of rubber drive roll 44. The signals to drive the Hewlett-Packard printhead were provided by a laboratory microcomputer which delivered to the printhead electrical pulses of sufficient duration and frequency to produce a continuous, solidly imaged strip having a width of about 28.5 millimeters, this dimension being the full width of the printhead. The imaging pulse voltages could be set at values in the range of 4 to 8 volts. These conditions of operation were in accordance with specifications given by Hewlett-Packard, Inc., and are representative of conditions encountered in commercial use of this device.

Fixture 36 for holding the printhead during use, and the apparatus for transporting donor 40 past printing elements 32 were constructed in accordance with the specifications provided by the printhead manufacturers to closely approximate the conditions encountered in commercial applications of the printhead.

The procedure for evaluating the effectiveness of the samples of the anti-stick layers of the present invention consisted of forming a coating solution of the material being evaluated, coating this solution onto Teijin Type F24G PET film having a caliper of 5.7 micrometers, drying this coating by means of heated air, and transporting the resulting coated film through the test apparatus while operating the printhead at a predetermined pulse voltage. A sample of receptor material was run in the test apparatus along with the imaging material being tested, so as to simulate as closely as possible the actual operating conditions encountered in use. In order to evaluate the influence of coating thickness on the anti-stick properties of the sample, coatings of several thicknesses were prepared for each anti-stick material.

It is known that sticking is most severe when the printhead is printing a solid bar running the full width of the printhead. To print a solid bar, every element 32 of printhead 30 was activated at every position on the sheet to be imaged, thus causing the maximum heating and maximum heated contact area, resulting in poorest possible imaging conditions.

Samples were initially run at low pulse voltages, and then at successively increasing pulse voltages, while applying print signals to all the segments of the printhead at the rate used to print solid coverage of the receptor, as described hereinabove. Performance was evaluated by noting (a) smoothness of transport through the test apparatus, including degree of tearing or ripping, (b) noise level during transport, and (c) contamination of the printhead. High noise levels were taken to be an indication of partial sticking, which indicated that the level of performance was unacceptable.

In order to be effective at a particular voltage, the anti-stick material being tested had to provide smooth transport of the film through the test apparatus, without producing excessive noise, without causing stoppage, jamming, tearing, or ripping of the film in the apparatus, and without contamination of the printhead. Additionally, the sample was required to provide effective performance at or above the nominal specified pulse voltage for the printhead being used, i.e., the pulse voltage used in commercially available thermal printing machines. In the case of dye transfer printing using the Kyocera Model KMT-128-8MPD 4-CP thermal printhead, the pulse voltage used in commercially available machines is about 16.0 volts. Therefore, if the particular anti-stick layer under test was effective at 16.0 volts or above in the test, it was considered to be effective for use in thermal printing machines using the Kyocera KMT-128-8MPD4-CP thermal printhead. In the case of testing release layers on the Hewlett-Packard apparatus, the anti-stick layer being tested was considered acceptable if it prevented sticking at an imaging pulse voltage of 8.0 volts.

In order to more clearly point out the advantages of the invention, the following non-limiting examples are provided.

EXAMPLE 1

An anti-stick coating was prepared from a polymeric blend, wherein the first component of the blend was an A-B diblock copolymer comprising an ethylene-propylene random copolymer (block A) copolymerized with polystyrene (block B), ("Kraton G-1701X", available from Shell Chemical Company), and the second component of the blend was a random copolymer of ethylene and propylene having about 60% by weight of ethylene and 40% by weight of propylene ("Polysar 306", available from Polysar International). Urea-formaldehyde particulate material was added to the composition. The particulate material had a primary particle size of 0.1–0.15 micrometer, these primary particles being agglomerated into larger particles having a size in the range of about 5–6 micrometers ("PergoPak M2", available from Ciba-Geigy). The coating solution of this example was formed by adding the foregoing ingredients to toluene in the amounts indicated:

| Ingredient | Amount (g) |
|---|---|
| A-B diblock copolymer of ethylene-propylene (A) and styrene (B), ("Kraton G 1701X") | 1.0 |
| Ethylene-propylene random copolymer ("Polysar 306") | 1.0 |
| Urea-formaldehyde particulate material ("PergoPak M2") | 2.0 |
| Toluene | 98.0 |

The resulting mixture was agitated at room temperature until the copolymers were dissolved and the particulate material appeared to be uniformly distributed. The resulting liquid composition was coated at a wet thickness of 18.3 micrometers onto Teijin Type F24G PET film having a caliper of 5.7 micrometers by use of a #8 Mayer rod, and dried by means of heated air. The resulting anti-stick layer had a thickness of about 0.37 micrometer. The sample was stored in roll form until testing, whereupon it was found to unroll easily, without blocking or sticking to itself. Evaluation was carried out in the Kyocera apparatus, as described hereinabove. The test samples ran quietly and smoothly at a printhead voltage of 16.0 volts, and the anti-stick layer formed by the composition prepared according to this example was deemed to be satisfactory for use in those commercial thermal dye transfer printing machines utilizing the Kyocera Model KMT-128-8MPD4-CP thermal printhead.

COMPARATIVE EXAMPLE A

This example illustrates the effect of low loadings of particulate material in the anti-stock layer of the present invention. A coating solution was prepared according to Example 1, with the exception that samples having various particulate loadings below 0.5 g were used. Samples were evaluated in the Kyocera test apparatus, as in Example 1. It was found that when loadings of less than 0.5 g of particulate material were used in the coating solution of Example 1, the benefits provided by the addition of particulate material were absent. In particular, the pulling force required to unwind the donor material, after being stored in roll form, was higher than preferred for many applications.

COMPARATIVE EXAMLPE B

This example illustrates the effect of high loadings of particulate material in the present invention. A coating solution was prepared according to Example 1, with the exception that samples having various particulate loadings above 5.0 g were used. Samples were evaluated in the Kyocera test apparatus, as in Example 1. It was found that when more than 5.0 g of particulate material were used in the formulation of Example 1, portions of the particulate material adhered poorly to the sheet and contaminated the printhead, indicating that the upper limit of loading for particulate material in the polymeric system of Example 1 had been reached.

EXAMPLE 2

An anti-stick coating solution was prepared by combining the following ingredients in the amount indicated at room temperature:

| Ingredient | Amount (g) |
|---|---|
| Ethylene-propylene copolymer containing 30% by weight of ethylene ("Polysar 306") | 3.0 |
| Toluene | 97.0 |

The mixture of the above-mentioned ingredients was agitated at room temperature until a clear solution was obtained. Anti-stick layers were prepared by coating this solution onto Teijin Type F24G PET film having a caliper of 5.7 micrometers, and drying with heated air. Solutions were coated at wet thicknesses of 6.8 and 20.5 micrometers, by means of #3 and #9 Mayer rods respectively, in order to evaluate the effect of the thickness of the anti-stick layer upon performance. The final thickness of the dried anti-stick coatings was 0.21 micrometer for the coating made with the #3 Mayer rod, and 0.62 micrometer for the coating made with the #9 Mayer rod. Samples prepared with both #3 and #9 Mayer rods ran smoothly through the Hewlett-Packard apparatus at 8.0 volts, which is the specified nominal voltage for this printhead. This level of performance was deemed to be acceptable.

EXAMPLE 3

A coating solution was prepared by combining the following ingredients in the amounts indicated at room temperature:

| Ingredient | Amount (g) |
|---|---|
| Ethylene-propylene copolymer containing 30% by weight of ethylene and an amount of diene sufficient for a standard rate of sulfur vulcanization ("Polysar 346") | 3.0 |
| Toluene | 97.0 |

The mixture of the above-mentioned ingredients was agitated at room temperature until a clear solution was obtained. Anti-stick layers were prepared by coating this solution onto Teijin Type F24G PET film having a caliper of 5.7 micrometers, and drying the coating with heated air. Samples were prepared using #3 and #9 Mayer rods, so as to evaluate the effect of thickness of the anti-stick layer. Samples prepared with both #3 and #9 Mayer rods, having dry thicknesses of 0.21 and 0.62 micrometer respectively, ran smoothly through the Hewlett-Packard apparatus at 8.0 volts. This level of performance was deemed acceptable. This example illustrates that a small amount of diene may be incorporated into the ethylene-propylene copolymer, while still retaining the anti-stick properties of the coating.

EXAMPLE 4

An anti-stick coating was prepared from a polymeric blend, wherein the first component of this blend was an A-B diblock copolymer comprising an ethylene-propylene random copolymer (block A) copolymerized with polystyrene (block B), ("Kraton G-1701 X", available from Shell Chemical Company), and the second component of the blend was a random copolymer of ethylene and propylene containing about 60% by weight of ethylene and about 40% by weight of propylene ("Polysar 306", available from Polysar International). A polymerized rosin having a softening temperature in the range of about 145–158° C. ("Dymerex", available from Hercules Incorporated) was also added to the composition. The coating solution of this example was formed by adding the foregoing ingredients to tetrahydrofuran in the amounts indicated:

| Ingredient | Amount (g) |
|---|---|
| A-B diblock copolymer of ethylene-propylene (A) and styrene (B), ("Kraton G 1701X") | .038 |
| Ethylene-propylene random copolymer ("Polysar 306") | .038 |
| rosin ("Dymerex") | .025 |
| tetrahydrofuran | 5.39 |

The resulting mixture was agitated at room temperature until the copolymers and the rosin were dissolved. The resulting solution was coated at a wet thickness of 11.4 micrometers by means of a #5 Mayer rod onto Teijin Type F24G PET film having a caliper of 5.7 micrometers and dried by means of heated air. The resulting anti-stick layer had a thickness of about 0.21 micrometer. The sample was stored in roll form until testing, whereupon it was found to unroll easily, without blocking or sticking to itself.

Evaluation was carried out on the Kyocera apparatus, as described hereinabove. The test samples ran quietly and smoothly at a printhead pulse voltage of 16.0 volts, and the anti-stick layer formed by the composition prepared according to this example was deemed to be satisfactory for use in those commercial dye transfer printing machines utilizing the Kyocera Model KMT-128-8MPD4-CP thermal printhead. This example shows that high softening temperature polymerized rosin can be used instead of particulate material to prevent the anti-stick layer from blocking or sticking to itself during storage in roll form.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A donor suitable for thermal printing comprising a backing, said backing comprising a polymeric material or a fibrous material, said backing having on one major surface thereof a layer of image-forming material, said image-forming material being transferable to a receptor upon application of heat, and said backing having on the opposite major surface thereof an anti-stick layer comprising at least one polymeric material having a non-cyclic, substantially completely saturated hydrocarbon backbone, said backbone having substantially only hydrogen atoms and methyl groups attached to randomly positioned carbon atoms thereon, with no more than one methyl group attached to any one backbone carbon atom.

2. The donor of claim 1, wherein said donor consists of three layers: 1) said backing, 2) layer of image-forming-material, and 3) said anti-stick layer, and said backing is disposed between said anti-stick layer and said layer of image-forming material.

3. The donor of claim 1, wherein said image-forming material comprises (1) a meltable wax or a meltable polymeric material and (2) a colorant.

4. The donor of claim 1, wherein said image-forming material comprises a sublimable dye.

5. The donor of claim 1, wherein said image-forming material comprises a leuco dye.

6. The donor of claim 1, wherein said image-forming material comprises at least one chemical substance which, upon application of heat, is capable of reacting with another material on said receptor to form a colored compound on said receptor.

7. The donor of claim 6, wherein said image-forming material comprises a phenolic compound.

* * * * *